June 9, 1936. A. FIELD 2,043,475

DENTAL FLASK FOR VULCANIZING TEETH

Filed May 13, 1935

INVENTOR,
Albert Field.
BY
Homer D. Smith.
ATTORNEY

Patented June 9, 1936

2,043,475

UNITED STATES PATENT OFFICE 2,043,475

DENTAL FLASK FOR VULCANIZING TEETH

Albert Field, Dayton, Ohio

Application May 13, 1935, Serial No. 21,159

4 Claims. (Cl. 18—33)

This invention relates to new and useful improvements in dental flasks for vulcanizing teeth.

After false teeth and the investment have been set in a mold and vulcanized, it is difficult to separate the mold from the vulcanized denture without breaking the teeth. It is the principal object of my invention, therefore, to provide a molding flask having a split metal section that may be easily removed from the base section without injuring in any way the vulcanized denture over which it is lifted.

The invention contemplates means for drawing the free ends of the split middle section together when the flask is assembled for the vulcanizing operation, and to release these free ends to permit the middle section to expand for disassembly of the flask without harm to the denture after the vulcanizing operation is completed.

Other important and incidental objects will be brought out in the following specification and particularly set forth in the subjoined claims.

Figure 1:
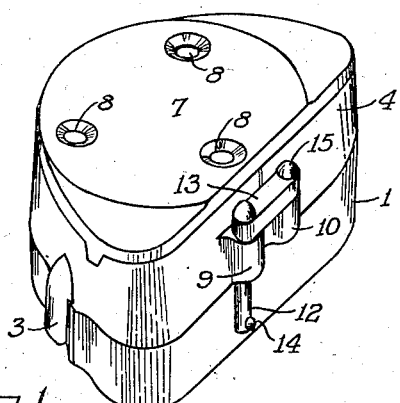
Figure 2:
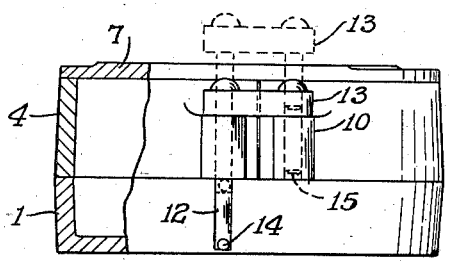
Figure 3:
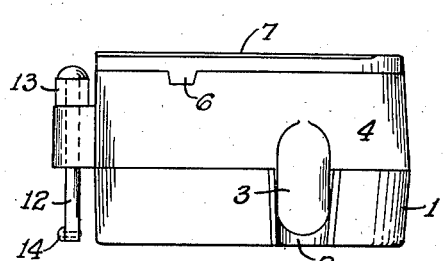
Figure 4:
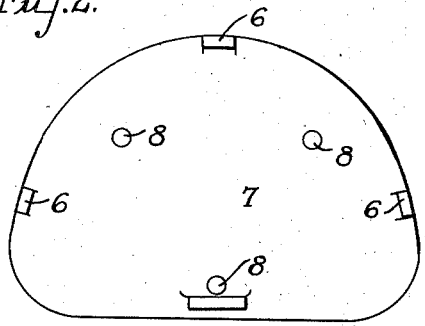
Figure 5:
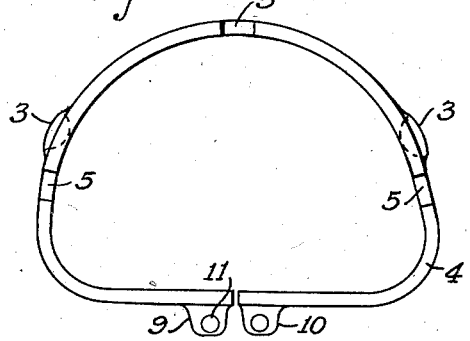

In the accompanying drawing illustrating my invention, Figure 1 is a perspective view of my dental flask. Figure 2 is a view of the back portion of the mold shown partly in section. Figure 3 is a side view of the mold. Figure 4 is a view of the under side of the cover. Figure 5 is a top plan view of the middle section of the mold. And Figure 6 is a top plan view of the base.

Figure 6:
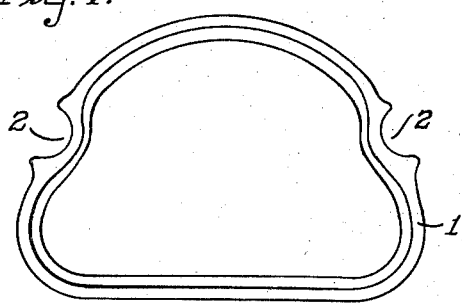

Referring to the accompanying drawing for a detailed description of my invention, the numeral 1 designates a flask base, preferably constructed of bronze, and being of cup shape, as illustrated in Figure 6.

The base section 1 which receives the investment and teeth to be vulcanized, is formed with two oppositely disposed recessed portions 2, 2, which receive projecting convex lug portions 3, 3 that project downwardly from a middle section 4, comprising a split band having the same contour as the base section 1.

The middle or second section, which is also preferably constructed of bronze, is formed in its top edge with notches 5, 5 to receive downwardly projecting lugs 6 on a cover plate 7 whose contour is substantially the same as the base and the middle section of the flask. Provided in this cover are waste holes 8 through which the plaster exudes when the cover is applied to the flask.

After the investment and the teeth are set on the base section 1 of the flask, the middle section is applied to the base by inserting the lugs 3 into its recesses 2, after which the free ends of the middle section are drawn tightly together by the following means.

Formed on the middle section 4, near the smaller ends thereof, are bosses 9 and 10, each formed with a vertical hole 11. Longitudinally movable within the hole 11 in the boss 9 is a pin 12 which is connected at its upper end to a cross head 13. This pin 12 carries at its lower end a stop pin 14 whose purpose is to limit its upward movement. Projecting downwardly from the other end of the cross head 13 is a short pin 15 which is adapted to enter the hole 11 in the boss 10 when that boss is sprung toward the boss 9.

The holes in the bosses 9 and 10, or the pins 12 and 15 themselves, may be so inclined to each other that after the latter descend into these holes, the free ends of the band 4 will be drawn more tightly together.

When the middle section 4 is applied to the bottom section, a phenolic resin or other plastic substance is poured into the flask around the denture, which rests upon the bottom of the flask. The cover 7 is then applied to the flask by inserting the lugs 6 in the notches 5 in the middle section 4, and as it is pressed down upon the middle section the waste plastic material is exuded through the holes 8 therein.

The closed flask is then subjected to heat for the vulcanization of the denture. After this operation is completed, the cover is removed and an upward pressure is exerted upon the lower end of the long pin 12 until the pin 15 clears the upper end of the boss 10, as shown in dotted lines in Figure 2. The split middle section 4 is now free to expand a sufficient amount to permit it to be lifted clear of the vulcanized denture without injuring it.

In the present type of flask it is difficult to remove the vulcanized denture from the flask without breaking the teeth, but when my form of flask with its split middle section is employed, no harm can result to the denture, since the expanded middle section may be removed therefrom in a non-engaging manner.

Having described my invention, I claim:

1. A vulcanizing flask of the type described, comprising a bottom section, a split, expansible second section removably applied to the bottom section, said second section being of one piece, resilient material normally in expanded position, a removable cover applied to the second section, and wedge pin means for drawing the free ends of the second section together during the assembly of said flask, and for releasing said ends to permit the second section to expand for removal from the bottom section without injury to the vulcanized object after the vulcanizing operation has been completed.

2. A vulcanizing flask of the type described, comprising a bottom section, a split, expansible band section removably applied to the bottom section, bosses on the band section, one near each free end thereof, each boss having a vertical hole projecting through it, and a staple member, the legs of which are inclined with respect to each other and adapted to be inserted in the holes in said bosses to draw the free ends of the band section together when the flask is assembled, and, when withdrawn, to release said ends to permit the band section to expand for removal over the vulcanized object.

3. A vulcanizing flask of the type described, comprising a bottom section having external side recesses, a split band section having downwardly projecting lugs for entrance into said recesses, said split band section being of one piece, resilient material normally in expanded position, wedge means for drawing the free ends of the split band together during the assembly of said flask, and for releasing them during the disassembly of the flask to permit the band to expand for removal over the vulcanized object.

4. A vulcanizing flask of the type described, comprising a bottom section, a split, expansible band section removably applied to the bottom section, bosses on the band section, one near each free end thereof, each boss having a vertical hole projecting through it, a pin longitudinally movable in the hole in one boss, a shorter pin movable into and out of the hole in the other boss, and a cross head to which said pins are secured, whereby the short pin may be moved into and out of the hole in its respective boss to co-operate with the other pin in drawing the free ends of the band together during the assembly of the flask, and for disconnecting these ends during the disassembly of the flask.

ALBERT FIELD.